United States Patent [19]

Andrews

[11] 3,881,252
[45] May 6, 1975

[54] ORTHODONTIC BRACKET EXTRACTION
[76] Inventor: Lawrence F. Andrews, 2025 Chatsworth Blvd., San Diego, Calif. 92107
[22] Filed: July 31, 1973
[21] Appl. No.: 384,196

Related U.S. Application Data
[63] Continuation-in-part of Ser. No. 249,684, May 1, 1972, abandoned.

[52] U.S. Cl. ................................ 32/14 A
[51] Int. Cl. ............................ A61c 7/00
[58] Field of Search ..................... 32/14 A

[56] References Cited
UNITED STATES PATENTS
3,504,438    4/1970   Wittman et al. ................ 32/14 A
3,660,900    5/1972   Andrews ........................ 32/14 A Primary Examiner—Robert Peshock
Attorney, Agent, or Firm—Richard K. MacNeill

[57] ABSTRACT

An orthodontic bracket technique for bodily tooth movement in which the orthodontic bracket has a groove recessed therein for the reception of an archwire, the bracket having its leading edge lower than its trailing edge with the groove geometry the same for creating an anti-rotation force as a tooth is moved bodily into a void, the anti-rotational force being of sufficient magnitude to cancel the rotational effect which occurs with use of conventional brackets. Optionally, an anti-tip angle can be put in the bracket grooves.

3 Claims, 5 Drawing Figures

PATENTED MAY 6 1975　　3,881,252

ORTHODONTIC BRACKET EXTRACTION

RELATED APPLICATIONS

This application is a continuation-in-part of an application for U.S. Letters Patent for an orthodontic bracket for bodily tooth movement, filed May 1, 1972, Serial No. 249,684 by Lawrence F. Andrews and now abandoned.

RELATED PATENTS

U.S. Pat. Nos. 3,660,900 May 9, 1972 Lawrence F. Andrews; 2,921,371 January 1960 Wallshein; 3,307,261 March 1967 Steiner; 2,908,974 October 1959 Stifter.

BRIEF DESCRIPTION OF THE INVENTION

The present invention relates to an orthodontic bracket and technique for bodily tooth movement cases and more particularly to an orthodontic bracket and technique for bodily tooth movement without attendant rotation.

According to the invention, an orthodontic bracket is provided for bodily tooth movement cases in which the leading edge is narrower than the trailing edge which results in an anti-rotation force vector applied thereto. This anti-rotation force vector is designed to be sufficient to overcome the rotational effects of a conventional orthodontic bracket having an archwire attached thereto parallel to the transverse axis of the tooth when moving a tooth into a predetermined area, for example an extraction site. It has been found emperically that the angle of the archwise groove compared to a parallel archwire groove is approximately 1° per millimeter of displacement, i.e., if the tooth is to be displaced or moved parallel to itself a distance of 6 millimeters, the groove in the bracket should be angled at approximately 6° when compared to a parallel standard prior arch bracket groove. The same angular displacement for anti-tip geometry as anti-rotation geometry holds true i.e., for each millimeter of tooth movement there is approximately 1° of anti-tip angle. With the anti-tip angle there is a 4° maximum and a 0° minimum. With the anti-rotation angle there is a 6° maximum and a 2° minimum. All of the angles should be held within a tolerance of plus or minus 1°. As will be appreciated by those skilled in the art, during parallel movement of a tooth there is also a tendency for the tooth to tip. Hence, if desired, an anti-tip angle can be built into the groove of the bracket to compensate for this.

An object of the present invention is the provision of an orthodontic bracket and technique for bodily tooth movement cases.

Another object of the invention is the provision of an orthodontic bracket and technique for bodily tooth movement cases for eliminating tooth rotation during movement.

A further object of the invention is the provision of an orthodontic bracket for bodily tooth movement cases for eliminating tipping during tooth movement.

Other objects and many of the attendant advantages will be readily appreciated as the same becomes better understood by reference to the following detailed description when considered in connection with the accompanying drawings in which like reference numerals designate like part throughout the Figures thereof and wherein.

DETAILED DESCRIPTION OF THE DRAWING

Figure 1:
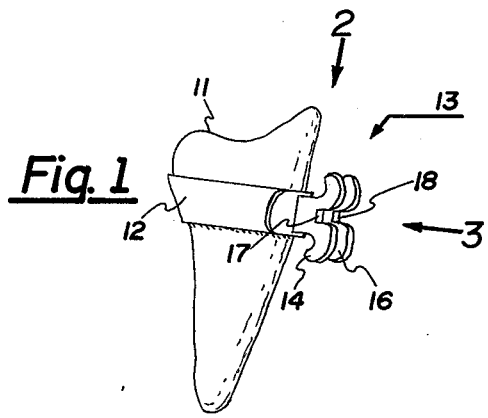
FIG. 1 is a side elevation view of the preferred embodiment of the present invention in situ.

Referring to FIG. 1, a tooth is shown at 11 having a toothband 12 thereon with an orthodontic bracket 13 coupled thereto. Orthodontic bracket 13 has cleats 14 and 16 having grooves 17 and 18, respectively, therein.

Figure 2:
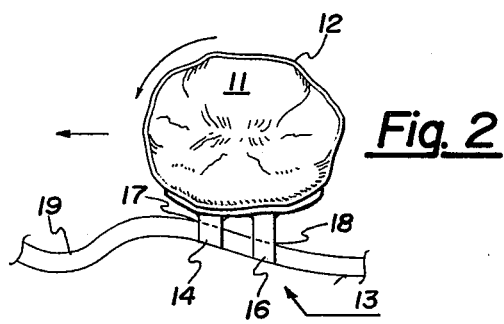
FIG. 2 is a bottom view of the embodiment of FIG. 1 showing an archwire installed therein.
Figure 3:
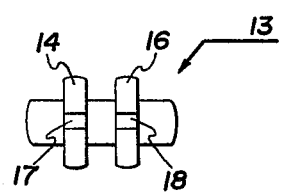
FIG. 3 is a front elevation view of the bracket of FIGS. 1 and 2.

Referring to FIG. 2, tooth 11 has a toothband 12 thereon carrying bracket 13. Bracket 13 has cleats 14 and 16 with grooves 17 and 18, respectively, therein. An archwire 19 is shown received by grooves 17 and 18.

Figure 4:
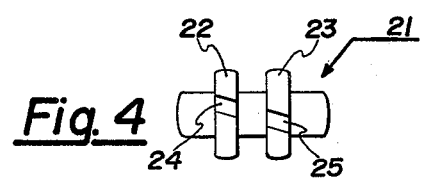
FIG. 4 is a front elevation view of a bracket with an anti-tip angle.

Referring to FIG. 4, a bracket 21 is shown having cleats 22 and 28 with grooves 24 and 25, respectively, therein.

Figure 5:
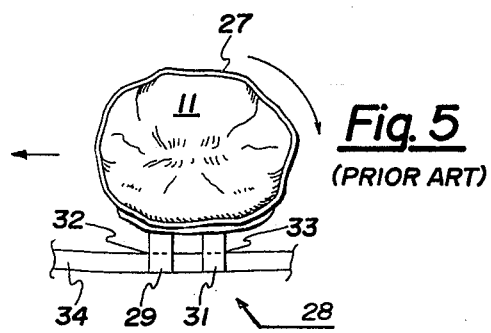
FIG. 5 is a bottom view of a prior art orthodontic bracket for bodily tooth movement cases.

Referring to FIG. 5, a tooth 11 is shown having a toothband 27 carrying a bracket 28 with cleats 29 and 31. Cleats 29 and 31 have grooves 32 and 33, respectively. Archwire 34 is received by grooves 32 and 33.

OPERATION

Referring back to FIG. 5, a typical prior art bracket is shown at 28 attached to band 27 which is mounted on tooth 11. Archwire 34 is secured to bracket 28 in grooves 32 and 33 by suitable tie wires, which are not shown in the interest of clarity. As the tooth is being moved bodily to the left as the arrow indicates, it would have a tendency to rotate clockwise also indicated by an arrow. It has been found empirically that it will rotate approximately 1° per millimeter of displacement or movement.

Referring to FIGS. 1 and 2, if the leading groove 17 in bracket 13 is closer to the base of bracket 13 than the trailing groove 18 will result in a counterclockwise vector force, i.e., tend to rotate tooth 11 in a counterclockwise direction, which will overcome or cancel the natural tendency of the tooth to rotate in a clockwise direction as shown in FIG. 5. Hence, the tooth will move parallel to itself into a void without rotation. As the archwire 19 moves the tooth into place, this anti-rotation force of bracket 13 will cause the tooth to rotate in a counterclockwise direction approximately the same amount as the angulation of bracket 13. After the archwire bracket has been removed the tooth will then rotate on its own back to a desired nonrotated position. If this terminal rotation did not take place, the tooth would rotate the same amount in a clockwise direction resulting in a displacement from normal.

Referring to FIG. 4, an anti-tip angle is shown built into grooves 24 and 25 in bracket 21. The purpose of this is substantially the same as the anti-rotational aspect of the bracket in that as a tooth is attempted to be moved parallel to itself without an anti-tip angle, the tooth will have a tendency to tip as it moves. This anti-tip angle will overcome that and result in a parallel tooth movement. Of course, this anti-tip angle is in addition to any other tip angle built into the bracket. It has been found that the amplitude of the anti-tip angle is substantially equal to two-thirds of a degree for each millimeter of movement.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. An orthodontic bracket for bodily tooth movement cases comprising:
   a bracket having a groove recess therein for the reception of an archwire, said bracket having a leading edge and a trailing edge relative to bodily tooth movement; and
   said leading edge being narrower than said trailing edge creating an angle between an installed archwire and a transverse axis of the tooth, said angle being substantially equal in degrees to the desired number of millimeters of tooth movement.

2. The orthodontic bracket for extraction cases of claim 1 wherein:
   said groove is angled a predetermined amount in a vertical plane for cancelling any tendency of the tooth to tip during bodily movement.

3. The orthodontic bracket of claim 2 wherein:
   said vertical plane angle is substantially equal in degrees to the desired number of millimeters of tooth movement.

* * * * *